Figures 1, 2, 3, 4:
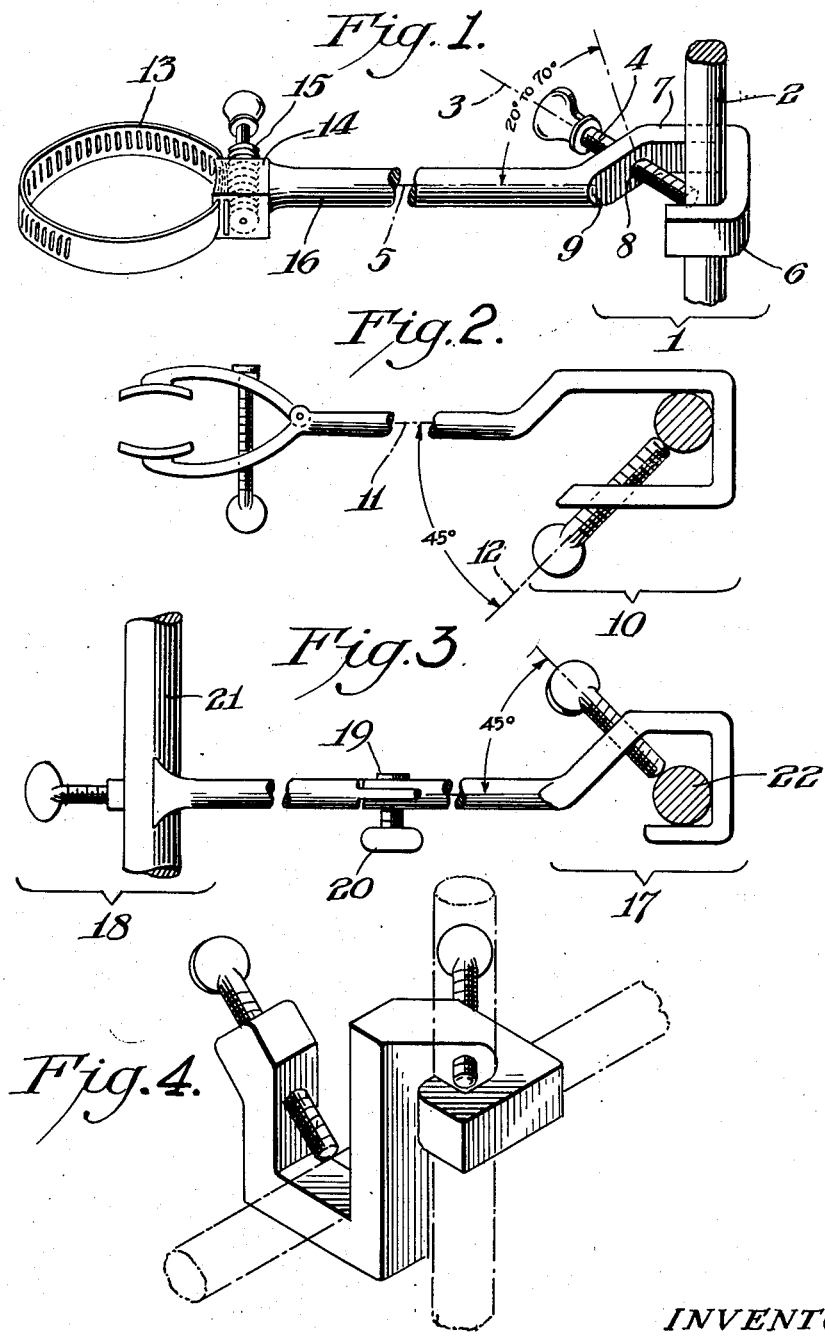

INVENTOR
Donald M. Smith,
BY
ATTORNEY.

Patented May 12, 1953

2,638,301

UNITED STATES PATENT OFFICE 2,638,301

ATTACHMENT STRUCTURE FOR LABORATORY CLAMPS

Donald M. Smith, Wilmington, Del.

Application January 28, 1947, Serial No. 724,757

4 Claims. (Cl. 248—229)

This invention relates to laboratory clamps and clamp holders. More particularly, it relates to an improved structure whereby laboratory clamps, clamp holders, and the like may be attached to support rods.

A typical clamp for use in supporting laboratory apparatus may consist of three parts, namely a gripping mechanism which comes into direct contact with the apparatus to be supported, a connecting bar, and an attachment structure. This latter structure comprises an opening by means of which the clamp may be placed directly in the desired position on the support rod without having to be slipped over the end of the rod, a V-shaped slot for receiving the support rod and fixing the position of the clamp relative to that of the support rod, and a thumb-screw for fastening the parts in these positions. The usual practice in the art has been to construct these clamps in such a way that the connecting bar and the thumb-screw extend away from the support rod in opposite directions. In other words, the center line of the connecting bar and the center line of thumb-screw form an angle of 180° relative to each other.

A typical clamp holder for use, for instance, in fastening together two support rods, may comprise two of the attachment structures described above. These may be in a fixed position relative to each other, or they may be connected by a swivel joint. The usual practice in the art has been to construct these clamp holders in such a way that the two thumb-screws are at opposite ends of the clamp holder from each other.

Clamps and clamp holders of the types described above have been widely used and have proved to be moderately satisfactory. They suffer, however, from several disadvantages. In the first place, when a technician is using them to set up his laboratory apparatus, he frequently finds that he must use first one hand and then the other to tighten the various thumb-screws. Secondly, he finds that he must frequently reach around in back of a support rod to tighten a thumb-screw. Either of these conditions may result in great inconvenience or in exposure to unnecessary hazards.

It is an object of this invention to overcome these disadvantages by providing an improved attachment structure whereby clamps, clamp holders and the like may be attached to support rods. Other objects of this invention will appear hereinafter.

This invention may be understood most readily by reference to Fig. 1, which depicts one of its embodiments. Briefly, the invention is concerned with an improved attachment structure 1 for attaching laboratory clamps, clamp holders, and the like to a support rod 2, the structure being such that the center line 3 of the thumb-screw 4 forms a front angle of about 20° to about 70° with the center line 5 of the main body of the clamp or clamp holder. In other words, the thumb-screw and the main body of the clamp, generally speaking, are located on the same side of the support rod rather than being on opposite sides thereof.

The invention will now be described in greater detail, again with reference to Fig. 1. The purpose of the corner-piece 6 (or V-shaped piece) is to fit closely against the support rod 2 and, with the assistance of the thumb-screw 4, to hold the entire clamp firmly in the desired position on the support rod. The arm 7 supports the corner-piece 6 and is fitted with a threaded hole 8 thru which the thumb-screw is inserted. By loosening the thumb-screw a little bit, the clamp may be moved to a different position on the support rod, where it may be fixed firmly again by retightening the thumb-screw. By loosening the thumb-screw considerably, the clamp may be removed completely from the support rod, there being a sufficiently wide opening between the corner-piece 6 and the point 9 to allow the support rod to pass thru. It will be noticed that the angle between the center-line 5 of the main body of the clamp and the center-line 3 of the thumb-screw is about 45°.

Fig. 2 shows a different embodiment 10 of the improved attachment structure, in which all the essential features of the invention are retained, and are merely assembled according to a slightly altered design. In particular, it will be noticed that the angle between the center-line 11 of the main body of the clamp, and the center-line 12 of the thumb-screw is about 45°.

By modifying the details of construction of this improved attachment structure, it is obvious that this invention may be adapted to a wide variety of uses. The size of the structure will be regulated by the approximate size of the support rods to which the clamps are to be attached, and by the amount of weight that it is desired to support. The angle, for instance, of the V-shaped corner-piece in either Fig. 1 or Fig. 2 may be 90°, or less than 90°, or greater than 90°. And the angle between the center-line of the main body of the clamp and the center-line of the thumb-screw need not be limited to exactly 45° but may advantageously be varied anywhere between about 20° and about 70°. Any suitable material, such as brass, stainless steel, enameled or plated metal, or the like, may be used in the construction.

Many superior laboratory clamps, clamp holders, and the like may be produced by combining the improved attachment structure of this invention with the various apparatus-gripping-mechanisms and adjustable connecting bars known to the art. One particularly preferred embodiment of this invention results from the combination of the present invention with the apparatus-gripping-mechanism disclosed in my copending application S. N. 724,756, filed January 28, 1947. This mechanism is also shown in Fig. 1 and comprises an indented or perforated band of flexible metal 13, a housing 14, and a worm 15 positioned within this housing. The housing is connected by means of the connecting bar 16 to the improved attachment structure 1. This housing is also fastened to one end of the perforated band 13, and the worm engages the other end of the band in such a way that turning the worm causes the band to be tightened or loosened, depending on the direction of rotation of the worm.

Another preferred embodiment of this invention, as shown in Fig. 3 results from the combination of the improved attachment structure 17 of this invention with a previously known type of attachment structure 18 to produce a clamp holder. This clamp holder may also be characterized, as shown, by a swivel joint 19 and fastening screw 20 whereby the two rods 21 and 22, to be connected may be held at any desired angle relative to each other.

And a particularly preferred usage of this invention, as shown in Fig. 4, comprises a clamp holder resulting from the combination of the attachment structure shown in Fig. 1, with the attachment structure shown in Fig. 2. It will be noted that, as the result of the present invention, the clamp holders in both Fig. 3 and Fig. 4 are so designed that the centerlines of the two thumb-screws create an angle of only about 45° between one another.

Numerous advantages arise from the use of the improved attachment structure of the present invention in making clamps, clamp holders, and the like. In the first place, it frequently enables the technician, in setting up his apparatus, to tighten all the necessary thumb-screws on a given clamp with one hand, thus leaving his other hand free. Secondly, when working in confined spaces, as is frequently the case near distillation still-pots or on vacuum benches, it means that the technician has only to leave space enough for his hand to go in along one side of his apparatus. Thirdly, he may never have to place his hand in back of the support rod to which his clamp is attached. This results in great convenience and much greater safety by avoiding a large amount of reaching for difficultly-placed thumb-screws. And fourthly, the invention, by making possible the construction of new types of clamps and clamp holders, greatly increases the diversity of structural equipment at the disposal of the technician, thus increasing the versatility of his apparatus arrangements.

It will occur to those skilled in the art that many modifications and alterations may be made in the improved attachment structures described herein without departing from the spirit and scope of the invention. It is not intended, therefore, that the invention should be restricted in any way other than by the claims appended hereto.

I claim:

1. In a laboratory clamp, the combination of an attachment structure adapted to partially encircle a support rod, and a connecting bar extending from one end of said attachment structure; said attachment structure comprising a V-shaped piece which is disposed on the end of the attachment structure away from the connecting bar and which is adapted to receive said support rod, a thumb screw mounted in a hole threaded in said attachment structure across from said V-shaped piece and adapted to hold said support rod firmly against said V-shaped piece, and an opening in said attachment structure through which the support rod can pass; the center lines of the connecting bar and the thumb screw extending away from the attachment structure at an angle of from about 20° to about 70° relative to each other.

2. In a laboratory clamp, the combination of an attachment structure adapted to partially encircle a support rod, and a connecting bar extending from one end of said attachment structure; said attachment structure comprising a V-shaped piece which is disposed on the end of the attachment structure away from the connecting bar and which is adapted to receive said support rod, a thumb screw mounted in a hole threaded in said attachment structure across from said V-shaped piece and adapted to hold said support rod firmly against said V-shaped piece, and an opening in said attachment structure through which the support rod can pass; the center lines of the connecting bar and the thumb screw extending away from the attachment structure at an angle of from about 45° relative to each other.

3. A laboratory clamp holder comprising two attachment structures joined together by a connecting bar and adapted to hold two rods in a fixed position relative to each other, in which at least one of said attachment structures comprises a V-shaped piece which is disposed on the end of the attachment structure away from the connecting bar and which is adapted to receive one of said rods, a thumb screw mounted in a hole threaded in said attachment structure across from said V-shaped piece and adapted to hold said rod firmly against said V-shaped piece, and an opening in said attachment structure through which said rod can pass; the center lines of the connecting bar and the said thumb screw extending away from the said attachment structure at an angle of from about 20° to about 70° relative to each other.

4. In a laboratory clamp, the combination of an attachment structure adapted to partially encircle a support rod, a connecting bar extending away from one end of said attachment structure, and, at the far end of said connecting bar from said attachment structure, means for gripping laboratory apparatus; said attachment structure comprising a V-shaped piece which is disposed on the end of the attachment structure away from the connecting bar and which is adapted to receive said support rod, a thumb screw mounted in a hole threaded in said attachment structure across from said V-shaped piece and adapted to hold said support rod firmly against said V-shaped piece, and an opening in said attachment structure through which the support rod can pass; the center lines of the connecting bar and the thumb screw extending away from the attachment structure at an angle of from about 20° to about 70° relative to each other.

DONALD M. SMITH

References Cited in the file of this patent

UNITED STATES PATENTS

| Number | Name | Date |
| --- | --- | --- |
| 1,707,754 | Bone | Apr. 2, 1929 |
| 1,754,929 | Atticks et al. | Apr. 15, 1930 |
| 2,263,112 | Warren | Nov. 18, 1941 |